United States Patent
Li et al.

(10) Patent No.: US 10,958,177 B2
(45) Date of Patent: Mar. 23, 2021

(54) OPTOCOUPLER CURRENT TRANSFER RATIO COMPENSATION

(71) Applicant: DIALOG SEMICONDUCTOR INC., Campbell, CA (US)

(72) Inventors: Tao Li, Campbell, CA (US); Pengju Kong, Campbell, CA (US); Juyoung Yoon, Campbell, CA (US); Qingqing Zong, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 16/428,771

(22) Filed: May 31, 2019

(65) Prior Publication Data
US 2020/0382006 A1 Dec. 3, 2020

(51) Int. Cl.
*H02M 3/335* (2006.01)

(52) U.S. Cl.
CPC ... *H02M 3/33515* (2013.01); *H02M 3/33523* (2013.01)

(58) Field of Classification Search
CPC .................. H02M 3/33515; H02M 3/33523
See application file for complete search history.

(56) References Cited

U.S. PATENT DOCUMENTS

| | | | |
|---|---|---|---|
| 9,467,056 B2 * | 10/2016 | Woo | H02M 3/33523 |
| 10,008,944 B2 * | 6/2018 | Li | H02M 3/33507 |
| 2008/0084713 A1 * | 4/2008 | Baurle | H02M 3/33515 363/21.01 |

* cited by examiner

*Primary Examiner* — Adolf D Berhane
*Assistant Examiner* — Afework S Demisse
(74) *Attorney, Agent, or Firm* — Haynes and Boone, LLP

(57) ABSTRACT

A flyback converter is disclosed having a secondary side controller that generates an input current for an optocoupler diode by driving a variable resistor with a control voltage. The secondary side controller varies a variable resistance for the variable resistor to compensate for current transfer ratio gain variations for the optocoupler.

9 Claims, 4 Drawing Sheets

OPTOCOUPLER CURRENT TRANSFER RATIO COMPENSATION

TECHNICAL FIELD

This application relates to switching power converters, and more particularly to a switching power converter with optocoupler current transfer ratio compensation.

BACKGROUND

In flyback converters with optocoupler-based feedback, a secondary-side sensing and compensation circuit generates a control signal based upon any error between the measured output voltage and a desired value for the output voltage. The control signal is converted into a diode current (Id) for the optocoupler. Based upon a current transfer ratio, the optocoupler produces a collector current (Ic). A primary-side controller modulates the switching of a primary-side power switch based upon the collector current.

But the gain of the optocoupler as determined by its current transfer ratio (CTR) is not constant with temperature and also varies from part to part, even for the same model of optocoupler. The current transfer ratio (Ic/Id) for the optocoupler determines the magnitude of the collector current as a function of the diode current magnitude. It is with the collector current Ic that the primary-side controller bases its modulation of the power switch.

However, due to CTR variation, a given value of diode current Id produces a range of values for the collector current Ic. This CTR variation varies the loop gain and resolution for the flyback converter. In addition, a digital-to-analog converter for forming the control signal may not be able to cover the required operation range for the collector current due to the CTR variation.

SUMMARY

A flyback converter is provided that includes a primary side controller configured to control a cycling of a power switch transistor responsive to a collector current from an optocoupler. The flyback converter also includes a secondary side controller including a variable resistor in series with a diode for the optocoupler, wherein the secondary side controller is configured to vary a variable resistance for the variable resistor to compensate for a current transfer ratio gain variation for the optocoupler.

These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

The optocoupler current transfer ratio compensation disclosed herein is applicable to any isolated switching power converter that utilizes an optocoupler to transmit an analog control signal across the galvanic isolation provided by the transformer. The following discussion will assume that the isolated switching power converter is a flyback converter, but it will be appreciated that other types of isolated switching power converters may be utilized. Similarly, the following discussion will assume that transmission through the optocoupler is from the secondary side of the transformer to the primary side but this communication direction may be reversed in alternate embodiments.

Figure 1:
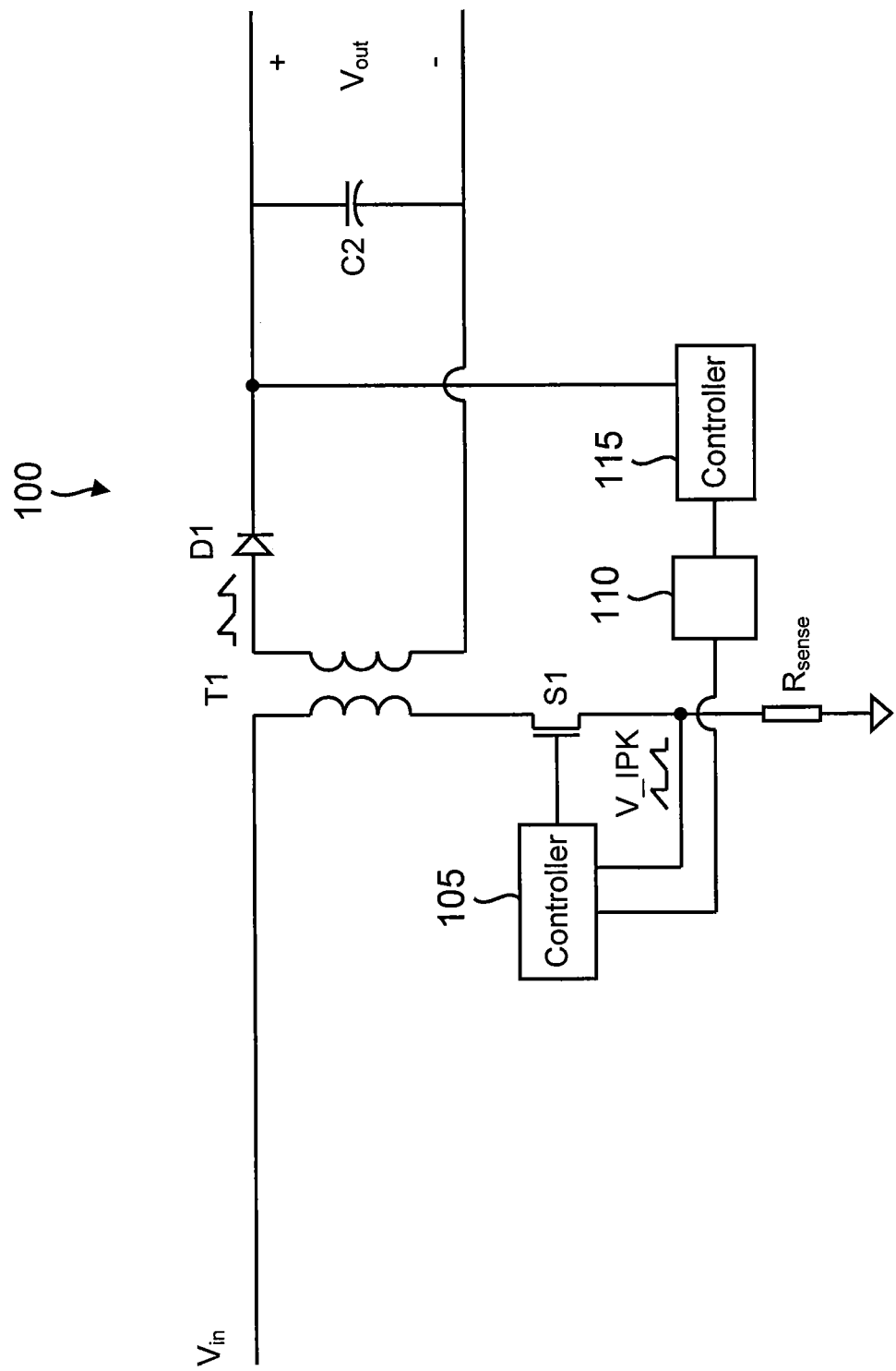
FIG. 1 illustrates an example flyback converter having optocoupler current transfer ratio compensation in accordance with an aspect of the disclosure.

An example flyback converter 100 with optocoupler current transfer ratio compensation is shown in FIG. 1. A primary side controller 105 controls the cycling of a power switch transistor S1 responsive to a received control signal (e.g., a received control signal voltage) from an optocoupler 110. The power switch transistor S1 is coupled between ground and a primary winding for a transformer T1. In each cycle, an input voltage Vin such as from the rectification of an AC mains voltage drives a primary current into the primary winding while the power switch transistor S1 is on. While the primary current flows, an output diode D1 on the secondary side of transformer T1 is reverse biased to prevent an output current from flowing in a secondary winding for the transformer T1. After a sufficient amount of magnetic energy is stored in the transformer T1, primary side controller 105 shuts off power switch transistor S. Output diode D1 then becomes forward biased to allow the secondary current to flow. In alternative embodiments, output diode D1 is replaced by a synchronous rectifier switch transistor. An output capacitor C2 smoothes a resulting output voltage Vout.

A secondary side controller 115 compares the output voltage to a reference voltage to generate a control signal. The generation of the control signal may be performed using either analog or digital control circuits. For example, in a digital implementation, the output voltage is digitized by an analog-to-digital converter (ADC) within secondary side controller 115. The resulting digitized output voltage is compared with a digital reference to form a digital error signal that is filtered (compensated) by a digital filter to create a digital control signal. In an analog implementation, secondary side controller 115 may include an error amplifier that compares the output voltage to a reference voltage such as generated by a bandgap reference. An analog loop filter filters the resulting error voltage from the error amplifier to form an analog control signal.

Regardless of whether the control signal is an analog or digital signal, it will typically be a signed signal that is either positive or negative depending upon whether the output voltage is higher or lower than its desired value. Optocoupler 110 cannot transmit negative currents so secondary side controller 115 is configured to add the control signal with an offset to produce an offset control signal voltage that is unsigned. Based upon the offset control signal voltage, secondary side controller 115 drives the diode current Id in optocoupler 110. In particular, secondary side controller 115 includes a variable resistor (discussed further below). To generate the diode current, secondary side controller 115 drives the variable resistance with the offset control signal voltage such that the diode current Id is inversely proportional by the resistance of the variable resistor to the offset control signal voltage. This variable resistance is denoted as "Ropto" in the following discussion. The diode current Id is thus proportional to a ratio of the offset control signal voltage and the variable resistance Ropto. Depending upon the current transfer ratio, the diode current Id causes a corresponding collector current Ic to flow in optocoupler 110. The collector current Ic produces the received control voltage signal that primary side controller 105 uses to adjust the switching of power switch transistor S1. For example, during a pulse width modulation mode of operation, primary side controller 105 adjusts the on time for the power switch transistor S1 by determining a peak value for the primary winding current that also flows through power switch transistor S1 to produce a sense voltage across a sense resistor Rsense. Primary side controller 105 may thus control the pulse width modulation of power switch transistor S1 by determining a peak voltage V_ipk and shutting off power switch transistor S1 when the primary winding current causes the sense resistor voltage to equal the peak voltage.

During normal operation, the feedback control in secondary side controller 115 functions to regulate the output voltage. But this regulation must be satisfied across the range of the current transfer ratio variation. As discussed earlier, temperature variation as well as part-to-part variation for optocoupler 110 may produce a wide variation of the current transfer ratio (CTR) such as a ten-fold (10×) increase from its minimum expected value to its maximum expected value. Such a wide range of CTR gain restricts the dynamic range of the feedback control for flyback converter 100. As will be explained further herein, secondary side controller 115 includes a current transfer ratio compensation circuit that varies the resistance of the variable resistance (Ropto) to reduce the effect of the CTR gain variation on the received control voltage signal. Flyback converter 100 thus advantageously enjoys increased dynamic range and response speed.

Although an analog implementation for secondary side controller 115 may be used in conjunction with the CTR compensation disclosed herein, note that the resulting analog loop filter will typically require multiple resistors and capacitors to achieve the necessary feedback loop poles and zeroes. These components would be external to the integrated circuit forming the remainder of secondary side controller 115 and thus increase manufacturing cost and complexity. The following discussion will thus be directed to a digital implementation for secondary side controller 115 without loss of generality. In a digital implementation, a digital control signal is added with the offset to form an offset digital control signal that is converted into the offset control voltage.

In general, the collector current magnitude for optocoupler 110 represents the power demand on the flyback converter. For example, as a load demands more power, the pulse frequency (in the case of pulse frequency modulation) or the pulse width (for pulse width modulation) increases. This increase in output power requires an increased level of the collector current. Conversely as the power demand decreases, the collector current magnitude decreases accordingly. But the collector current is proportional to a product of the diode current Id discussed above and the CTR. Since the diode current Id is proportional to the offset control signal voltage/Ropto, the received control signal is thus proportional to a product of the offset control signal voltage times the CTR and divided by Ropto. With the collector current maintained constant, an increase in the CTR such as from temperature changes will thus cause the offset control signal voltage to decrease even though the power demands are not changing. Conversely, a decrease in the CTR will tend to increase the offset control signal voltage.

Secondary side controller 115 thus uses the offset digital control signal as a proxy to measure the CTR variation. To reduce noise and smooth the resulting feedback loop changes, secondary side controller 115 may respond to a time-averaged version of the offset digital control signal. If this time-averaged version of the offset digital control signal voltage exceeds an upper threshold level (designated herein as Vhl), secondary side controller 115 decreases the variable resistance Ropto. This decrease compensates for the decrease in CTR as indicated by the increased level for the offset digital control signal. Conversely, if the time-averaged version of the offset digital control signal decreases below a lower threshold value (designated herein as Vll), secondary side controller 115 increases the variable resistance Ropto. This increase compensates for the increase in CTR as indicated by the decreased level for the offset digital control signal.

Figure 2:
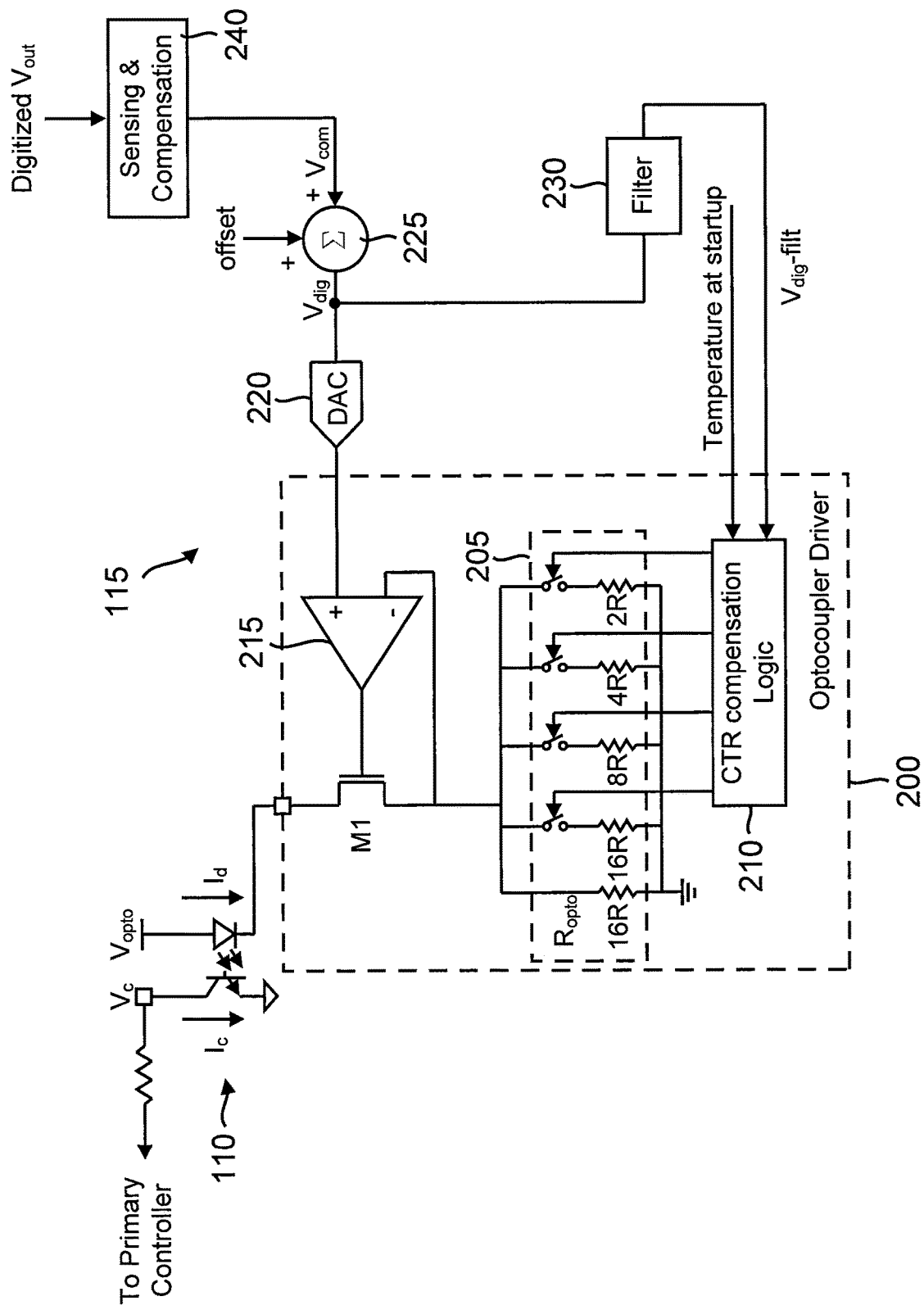
FIG. 2 is a circuit diagram for portions of a secondary side controller having optocoupler current transfer ratio compensation in accordance with an aspect of the disclosure.

To control the compensation of the CTR, secondary side controller 115 includes a CTR compensation circuit. An example CTR compensation circuit 200 is shown in FIG. 2. CTR compensation circuit 200 also functions as an optocoupler driver for optocoupler 110. A sensing and compensation circuit 240 is configured to compare the digitized output voltage Vout to a reference value to form an error signal that is compensated to produce a digital control signal Vcom as is conventional in the secondary controller arts. An adder 225 adds the digital control signal Vcom with the offset to form the offset digital control signal Vdig. A DAC 220 digitizes the offset digital control signal Vdig to form the offset control signal voltage that is received at a non-inverting input of a differential amplifier 215 that drives a gate of an NMOS transistor M1. For brevity, the offset control signal voltage will be referred to as the control signal voltage in the following discussion. The source of transistor M1 is connected to the inverting input of differential amplifier 215. Differential amplifier 215 thus functions to drive the gate of transistor M1 so that its source voltage equals the control signal voltage. The source of transistor M1 couples to ground through a variable resistor 205 having the variable resistance Ropto. Since the control signal voltage is replicated at the source of transistor M1, this voltage divided by the variable resistance Ropto determines the drain current conducted by transistor M1. In turn, since the drain of transistor M1 is in series with the diode in optocoupler 110, the diode current Id equals the control signal voltage divided by the variable resistance Ropto. This diode current Id multiplied by the CTR gain equals the collector current Ic for optocoupler 110. As discussed previously, the collector current Ic is a proxy for the output power load of the flyback converter such that it should stay constant for a fixed load. With the collector current Ic staying constant, the signal control voltage will be inversely proportional to the CTR gain.

Figure 3:
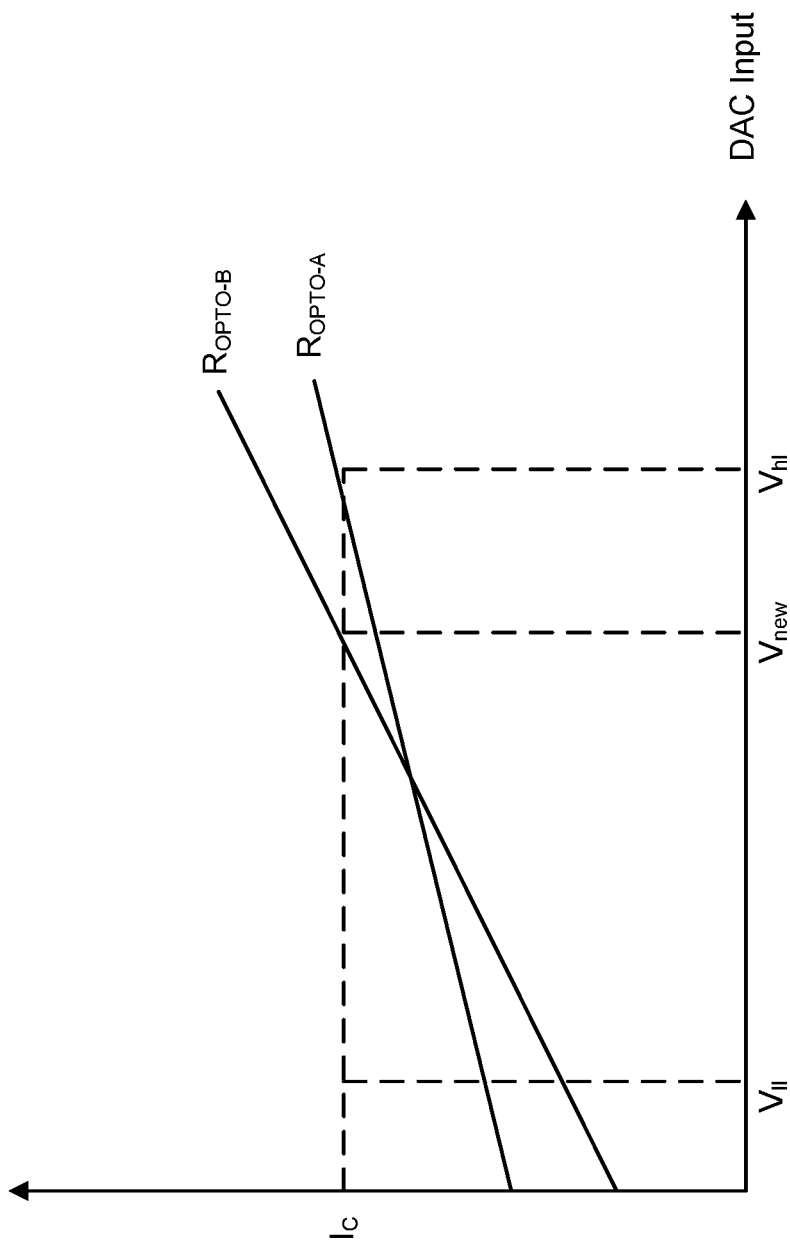
FIG. 3 is a graph of the collector current as a function of the DAC input for two different values of the variable resistance Ropto in the secondary side controller of FIG. 2.

To compensate for the CTR variation, CTR compensation circuit 200 receives a moving time-averaged version of the offset digital control signal Vdig such as formed by a filter 230 so that a CTR compensation logic circuit 210 can compare a time-averaged version of the offset digital control signal Vdig_filt to the high and low thresholds. An example high threshold Vhl and a low threshold Vll for the time-averaged signal Vdig_filt is shown in FIG. 3. In this figure, it is assumed that the time-averaged signal Vdig_filt is the same as the offset digital control signal Vdig that functions as the input to DAC 220. Suppose that the time-averaged signal Vdig_filt equals or exceeds the high threshold Vhl. Note that DAC 220 has a limited dynamic range. The offset digital control signal Vdig must thus be within this dynamic range, which is extends from a lower bound to an upper bound. To keep the offset digital control signal Vdig within this dynamic range, the high threshold Vhl may be set at some value slightly below the upper bound for the DAC dynamic range. Similarly, the low threshold Vll may be set at some value slightly above the lower bound for the DAC dynamic range.

Suppose that CTR compensation logic circuit 210 has detected that the time-averaged signal Vdig_filt equals or exceeds the high threshold Vhl. If the variable resistance Ropto is not at its lower limit, CTR compensation logic circuit 210 may then decrease the variable resistance Ropto. In CTR compensation circuit 200, variable resistor 205 is formed by a power of two progression of selectable resistors and a default (always selected) resistor. The power of two progression is defined with regard to an arbitrary resistance R. The default resistor has a resistance of 16R. There is also a selectable resistor of 16R, a selectable resistor of 8R, a selectable resistor of 4R, and a selectable resistor of 2R. Each selectable resistor is selected through a corresponding switch controlled by CTR compensation logic circuit 210. When selected, each selectable resistor combines in parallel with the default resistor. However, it will be appreciated that the actual implementation of variable resistor 205 may be varied in alternative embodiments. For example, the variable resistance may be increased or decreased in equal steps in its alternative embodiments.

By varying the on and off state of the switches in variable resistor 205, CTR compensation logic circuit 210 may vary the resulting variable resistance Ropto. For example, if all the switches are open, the variable resistance Ropto equals 16R. If just the switch for the selectable resistor 16R is closed, the variable resistance is reduced by 2 to 8R. This power of two progression can be continued by the appropriate selection of switches. The minimum variable resistance is produced with all the switches closed to select for all the variable resistances. Referring again to FIG. 3, since the time-averaged signal Vdig_filt equals or exceeds the high threshold Vhl and the variable resistance can be reduced, CTR compensation logic circuit 210 controls the switches so that the variable resistance Ropto is effectively reduced by one-half from a resistance of Ropto_A to a resistance of Ropto_B. At each of these resistances, there is a corresponding proportionality between the offset digital control signal Vdig and the optocoupler collector current Ic. Since this proportionality is inverse with regards to the variable resistance Ropto, the slope for the proportionality at the resistance Ropto_B is steeper than that for the resistance Ropto_A. This reduction in the variable resistance Ropto from Ropto_A to Ropto_B thus causes the offset digital control signal Vdig to drop to a value Vnew. But due to the increased slope from resistance Ropt_B, the resulting collector current Ic that results from this reduction in the offset digital control signal Vdig is unchanged from its value at the upper threshold Vhl.

When the time averaged signal Vdig_filt equals or falls below the low threshold Vll and the variable resistance Ropto is not at its upper limit, then the variable resistance Ropto is increased to its next level. In a power of two progression, this next level would be approximately twice as high as its previous value. But the progression up and down of the variable resistance Ropto may be varied in alternative embodiments.

Referring again to FIG. 2, CTR compensation logic circuit 210 may respond at startup to a temperature measurement to set the initial default starting value for the variable resistance Ropto. CTR compensation logic circuit 210 may then wait before varying the variable resistance Ropto until the offset digital control signal Vdig has exceeded a starting threshold value. During the sampling period for the digital control signal Vcom in which the variable resistance Ropto is changed, there is a sudden change in loop gain for the flyback converter. Thus, the digital control signal Vcom is not obtained in its normal fashion for this sampling period. In other words, secondary side controller 115 does not calculate the current sample for the control signal Vcom using its sensing and compensation circuit 240 as it would during normal operation.

The current sample for the control signal Vcom during the sampling period in which there has been a sudden change in loop gain is calculated from the previous sample for the control signal Vcom. The goal is to change the current sample so that the previous sample and the current sample produce the same value for the diode current Id despite the change in loop gain. For example, if the variable resistance Ropto is increased by a factor of two, then the current sample equals the twice the previous sample plus a first offset. Conversely, if the variable resistance Ropto is reduced by a factor of two, then the current sample equals one-half of the previous sample minus a second offset. Note that DAC 220 introduces an offset in that it produces some output voltage for its minimum input (the beginning of its dynamic range). The calculation of the first offset and the second offset takes into account this DAC offset as well as the offset added at adder 225 so that the diode current Id remains unchanged despite the loop gain change. Following this calculation of the current sample for the control signal Vcom, secondary side controller 115 calculates the subsequent samples of the control signal Vom in the normal fashion using sensing and compensation circuit 240.

Figure 4:
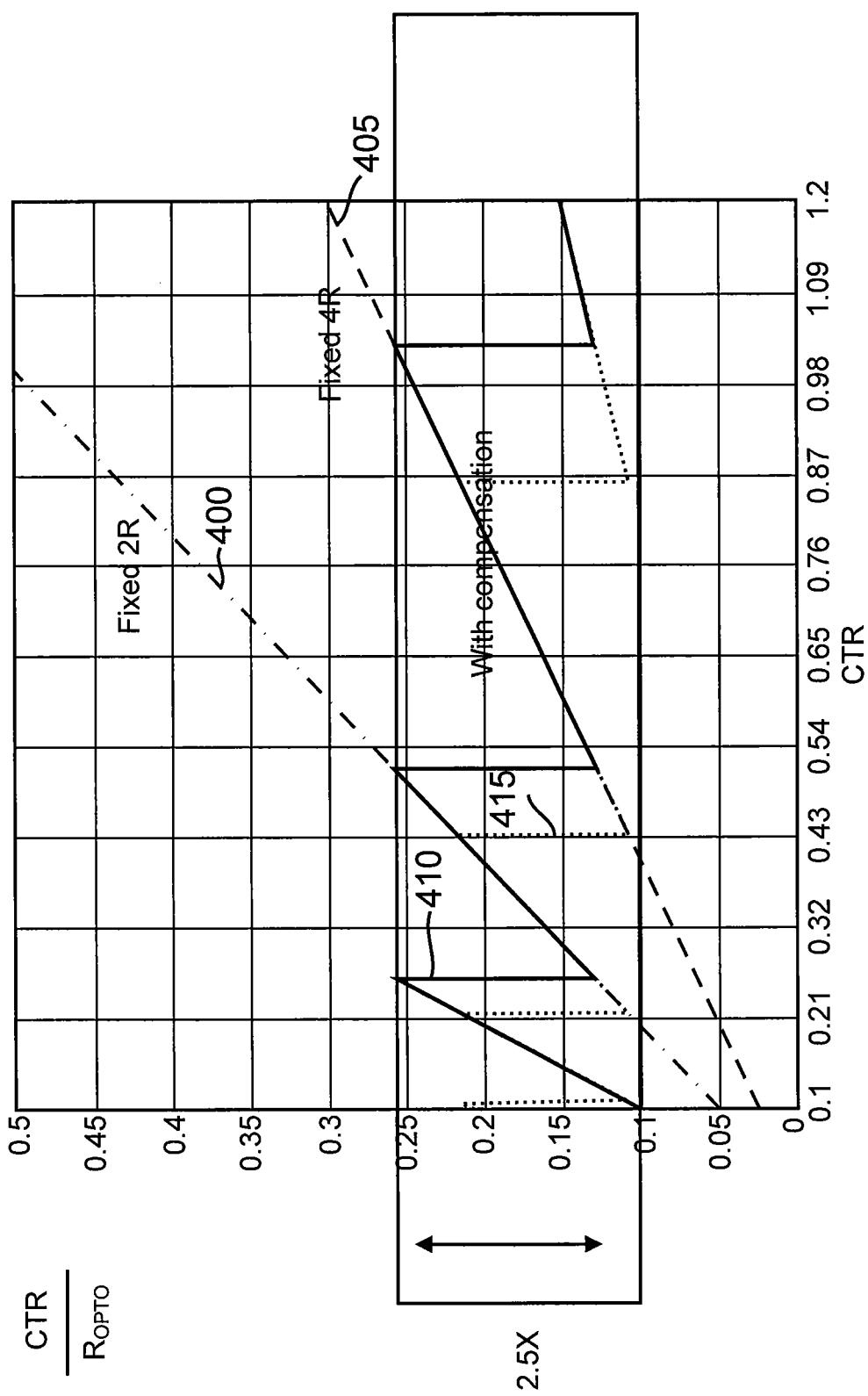
FIG. 4 is a graph of the loop gain variation as a function of the CTR variation with and without the CTR compensation disclosed herein for an example embodiment.

Note that the variation of the variable resistance Ropto not only compensates for the CTR variation but also effectively extends the dynamic range of DAC 220. The resulting compensation of the CTR variation on the loop gain as represented by the ratio of CTR/Ropto is shown in FIG. 4 for an example embodiment. The CTR varies from an initial value of 0.1 to 1.2, which represents more than a 10-fold variation. Such an order of magnitude variation is representative of the combined CTR variation from temperature variations and also part-to-part variations. A slope 400 represents a first conventional loop gain variation (no CTR compensation) for a fixed value of the resistance Ropto equaling an arbitrary value of 2R. The loop gain variation for this fixed Ropto resistance varies from 0.05 to 0.5, which is a ten-fold variation. Similarly, a slope 405 represents a second conventional loop gain variation for a fixed value of the resistance Ropto equaling 4R. The loop gain variation for this fixed Ropto resistance varies from approximately 0.025 to 0.3, which again is an approximate ten-fold variation.

A varying slope 410 represents the loop gain variation from CTR compensation as discussed herein as the variable resistance Ropto is increased successively from its minimum value to its maximum value for the variable resistor 205. Another varying slope 415 represents the loop gain variation from CTR compensation as the variable resistance Ropto is decreased successively from its maximum value to its minimum value for the variable resistor 205. In both cases, the loop gain variation is reduced to a 2.5× variation, which is considerably improved compared to the conventional ten-fold variation.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. An optocoupler current transfer ratio (CTR) compensation circuit for an isolated switching power converter having a primary side and a secondary side, comprising:
    an adder configured to add a digital control signal for the isolated switching power converter with an offset to form an offset digital control signal;
    a digital-to-analog converter (DAC) configured to convert the offset digital control signal into an offset control signal voltage; and
    a CTR compensation circuit including a variable resistor having a variable resistance, the CTR compensation circuit being configured to vary the variable resistance responsive to the offset digital control signal, wherein the CTR compensation circuit is further configured to use the variable resistor to convert the offset control signal voltage into a diode current for an optocoupler diode in an optocoupler.

2. The optocoupler CTR compensation circuit of claim 1, wherein the isolated switching converter is a flyback converter.

3. The optocoupler CTR compensation circuit of claim 2, wherein the flyback converter further comprises a primary side controller configured to control a cycling of a power switch transistor responsive to a collector current from the optocoupler.

4. The optocoupler CTR compensation circuit of claim 1, further comprising:
    a field effect transistor having a first terminal coupled to ground through the variable resistor and a second terminal coupled to the optocoupler diode; and
    a differential amplifier having an inverted input connected to a source of the field effect transistor and having an output connected to a gate of the field effect transistor; wherein an output of the DAC is connected to a non-inverting input of the differential amplifer.

5. The optocoupler CTR compensation circuit of claim 4, wherein the field effect transistor is an NMOS transistor.

6. The optocoupler CTR compensation circuit of claim 4, further comprising:
    a filter configured to form a time-averaged version of the digital offset control signal; and
    a compensation logic circuit configured to increase the variable resistance responsive to the time-averaged version of the digital offset control signal being greater than a high threshold value, wherein the compensation logic circuit is further configured to decrease the variable resistance responsive to the time-averaged version of the digital offset control signal being less than a low threshold value, and wherein the high threshold value is greater than the low threshold value.

7. The optocoupler CTR compensation circuit of claim 6, wherein the variable resistor is a power of two variable resistor.

8. The optocoupler CTR compensation circuit of claim 1, further comprising:
    a sensing and compensation circuit configured to generate the digital control signal responsive to a difference between an output voltage and a desired value for the output voltage.

9. The optocoupler CTR compensation circuit of claim 6, wherein the compensation logic circuit is further configured to set the variable resistance at a startup of the isolated switching power converter to a default value responsive to a temperature measurement.

* * * * *